United States Patent
Samaan et al.

(10) Patent No.: US 7,363,430 B2
(45) Date of Patent: Apr. 22, 2008

(54) DETERMINATION OF CACHE ENTRY FOR FUTURE OPERATION

(75) Inventors: Samie B. Samaan, Lake Oswego Avenue, OR (US); Avinash Sodani, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 413 days.

(21) Appl. No.: 11/100,273

(22) Filed: Apr. 6, 2005

(65) Prior Publication Data
US 2006/0230228 A1  Oct. 12, 2006

(51) Int. Cl.
*G06F 12/12* (2006.01)

(52) U.S. Cl. .................... 711/136; 711/118; 711/131; 711/133; 326/104

(58) Field of Classification Search .............. None
See application file for complete search history.

(56) References Cited

U.S. PATENT DOCUMENTS 5,274,790 A * 12/1993 Suzuki ................ 711/133
5,367,659 A * 11/1994 Iyengar et al. ........... 711/136
5,594,886 A * 1/1997 Smith et al. ............. 711/136
2003/0200404 A1* 10/2003 Wicki et al. ............. 711/156

* cited by examiner

*Primary Examiner*—Alan M Otto
(74) *Attorney, Agent, or Firm*—Buckley, Maschoff & Talwalkar LLC (57) ABSTRACT

A system may include M cache entries, each of the M cache entries to transmit a signal indicating a read from or a write to the cache entry and comprising a data register and a memory address register, and K layers of decision cells, where $K=\log_2 M$. The K layers M/2 decision cells of a first layer to indicate the other one of the respective two of the M cache entries and to transmit a hit signal in response to the signal, a second layer of M/4 decision cells to enable the other one of the respective two of the M/2 decision cells of the first layer and transmit a second hit signal in response to the signal, a (K−1)th layer of two decision cells to enable the other one of the respective two decision cells of the (K−2)th layer and transmit a third hit signal in response to the second hit signal, and a Kth layer of a root decision cell to enable the other one of the respective two decision cells of the (K−1)th layer in response to the third hit signal.

17 Claims, 11 Drawing Sheets

DETERMINATION OF CACHE ENTRY FOR FUTURE OPERATION

BACKGROUND

A processor is typically able to access cache memory more quickly than the processor can access other types of memory, such as a Random Access Memory (RAM) module or a hard drive. Cache memory is therefore often used to store data that is likely to be needed in the near future. When new data is to be written to a cache memory, it is preferable to overwrite data that has not been recently requested. Hence, new data is written either to a cache entry that corresponds to the address of the new data, or to a cache entry whose usage history indicates that the cache entry has not been recently written to or read from. Accurate determination and evaluation of cache entry usage histories often requires complex or otherwise inefficient implementations.

DETAILED DESCRIPTION

Figure 1:
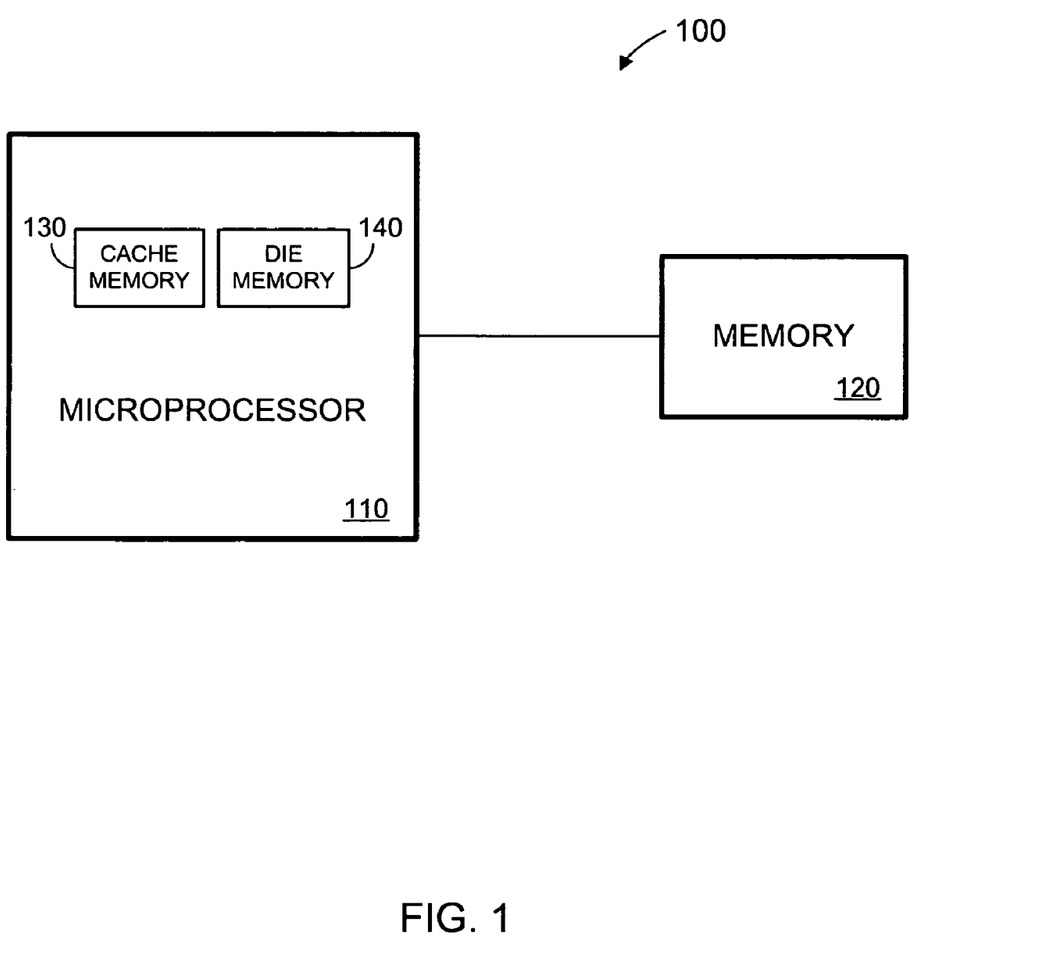
FIG. 1 is a block diagram of a system according to some embodiments.

FIG. 1 is a block diagram of system 100 according to some embodiments. System 100 comprises microprocessor 110 coupled to memory 120. Microprocessor 110 includes cache memory 130 and die memory 140. System 100 may reside in a desktop computing system or any other suitable system.

According to some embodiments, microprocessor 110 is a Pentium 4® microprocessor and memory 120 comprises a Dual In-line Memory Module (DIMM). Microprocessor 110 and memory 120 may be directly coupled via memory bus 150 that is disposed in a motherboard or other substrate to which microprocessor 110 and memory 120 are attached. Microprocessor 110 may also or alternatively be coupled to memory 120 via a separate memory controller chip. Memory 120 may comprise any element or elements for storing data, including but not limited to a hard drive, a CD-RW or other removable storage medium, and an external storage device Cache memory 130 may comprise registers that are integrated into the die of microprocessor 110. More specifically, cache memory 130 may include any number of cache entries, with each cache entry comprising an address register and a data register. In some embodiments, cache 130 is associated with a functional block of microprocessor 110 and is used to store a register allocation table (RAT). Such a functional block may include a die memory 140, which may be larger than cache 130. In a particular example of some embodiments, die memory 140 comprises 2k entries and cache 130 comprises 64 entries. Cache memory 130 may be used to reduce the time required to access data stored in die memory 140.

Figure 2:
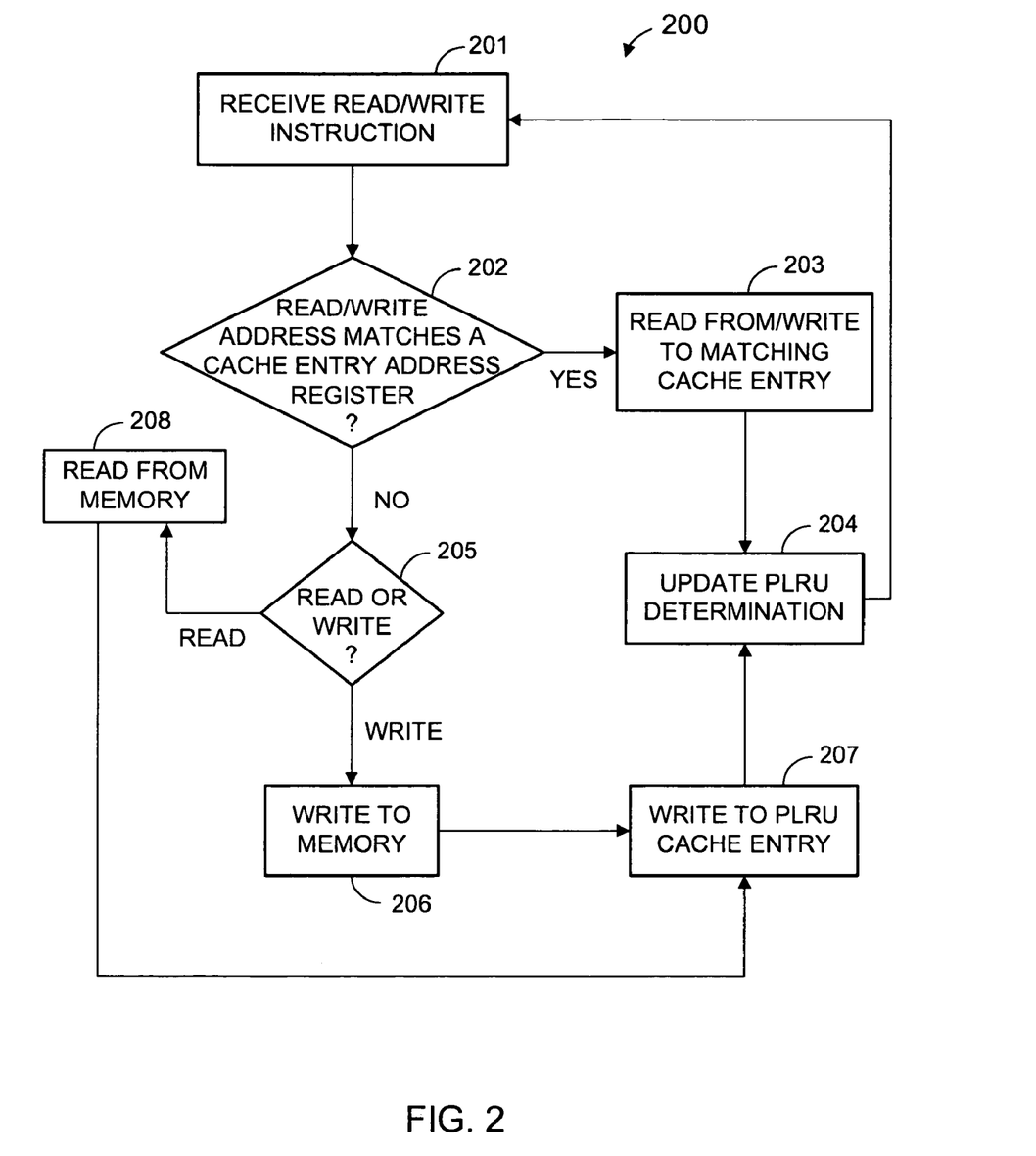
FIG. 2 is a flow diagram of a process to read from and write to a cache memory according to some embodiments.

FIG. 2 is a flow diagram of process 200 to determine a pseudo least recently-used (PLRU) cache entry according to some embodiments. As described herein, a PLRU cache entry is not necessarily, but may be, the least recently-used cache entry of the cache entries under consideration. A PLRU determined by process 200 is, more particularly, a cache entry to which new data should be written if none of the cache entries is associated with the memory address of the new data. According to some embodiments, such determination and writing may provide more efficient system performance in comparison to other cache memory systems.

Process 200 may be embodied in program code read from one or more of a readable medium, such as a floppy disk, a CD-ROM (Compact Disc-Read Only Memory), a DVD-ROM (Digital Video Disc-Read Only Memory), a Zip™ disk, a magnetic tape, or a signal encoding the program code. Hardware elements may be used in place of, or in combination with, code for implementation of processes according to some embodiments. Thus, embodiments are not limited to any specific combination of hardware and software. Software implementations of some embodiments may be more efficient than software implementing true LRU algorithms.

Process 200 may be implemented by system 100 of FIG. 1, and some embodiments may operate in conjunction with memory types other than the cache memories mentioned above. Process 200 will be described below in conjunction with cache memory 130 and die memory 140. Some embodiments may also or alternatively be used in conjunction with a memory other than die memory 140, including but not limited to memory 120.

Initially, at 201 of process 200, a read instruction or a write instruction is received. The instruction may be generated by microprocessor 110 through the execution of code stored in memory 120 or another medium. The instruction includes a memory address from which data is to be read (e.g., if a read instruction was received) or to which data is to be written (e.g., if a write instruction was received). The memory address may correspond to a memory address of die memory 140. If a write instruction is received at 201, the instruction also includes data to be written to the memory address.

Next, at 202, it is determined whether the memory address of the received instruction matches memory address information that is stored in an address register of any cache entry. As described above, cache memory 130 includes a plurality of cache entries, and each cache entry includes an address register and a data register. The address register of each cache entry stores information that indicates a specific memory address of die memory 140. The information may be identical to the specific memory address or may be encoded to otherwise indicate the specific address.

If the memory address of the received instruction matches memory address information of a cache entry, the data register of the cache entry is read from (or written to) at 203. Any currently- or hereafter-known system for reading from and/or writing to a cache entry data register may be used at 203. In a case that the instruction received at 201 is a write instruction, any data written to the data register of the cache entry at 203 may also be written to the specific memory address of memory 140 at 203.

Figure 3:
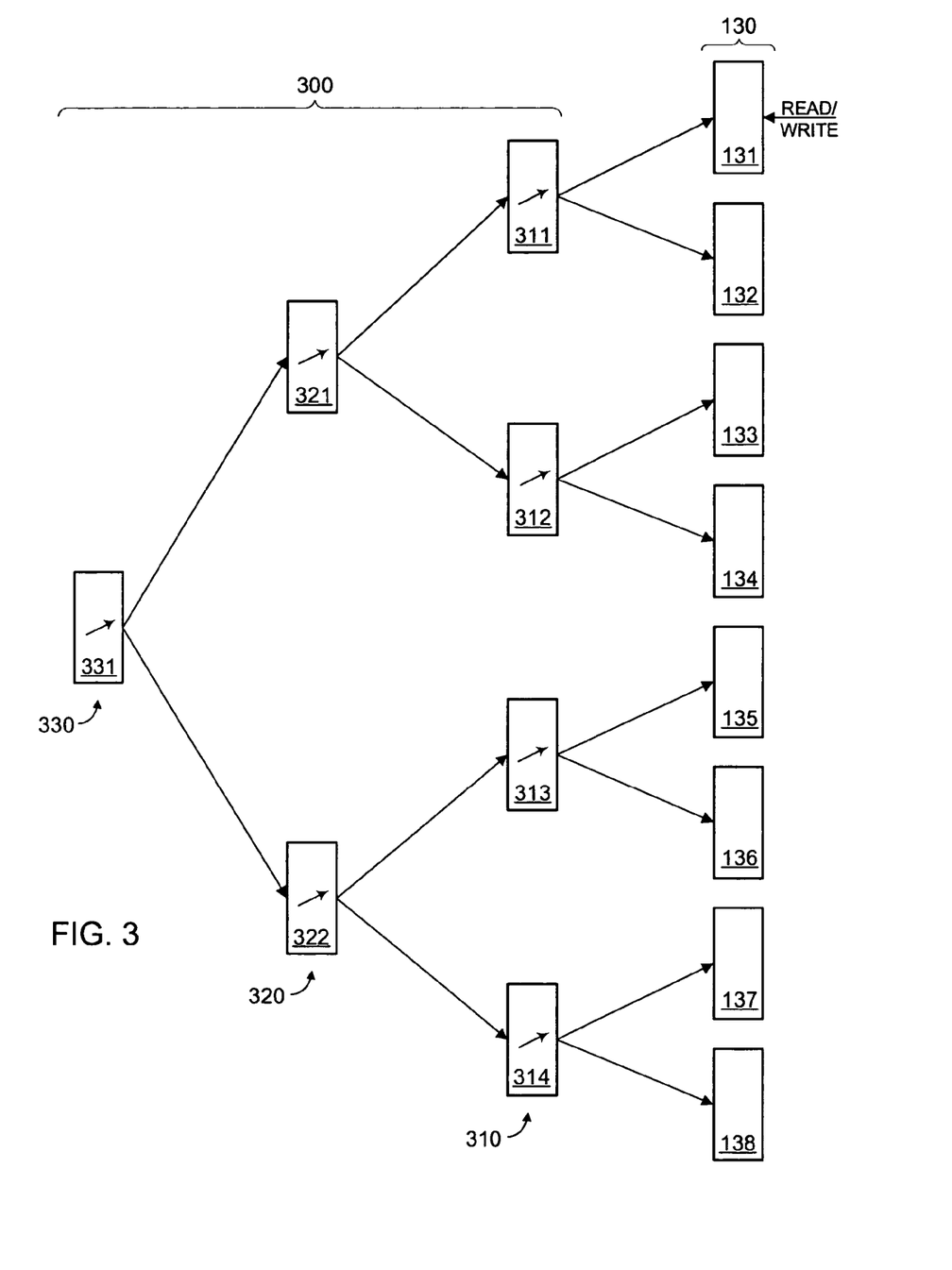
FIG. 3 is a block diagram representing cache entries and decision cell layers according to some embodiments.

A PLRU determination is then updated at 204. FIG. 3 is a block diagram representing cache memory 130 and decision tree 300 for the purposes of explaining some embodiments of 204. As shown, cache memory 130 includes eight cache entries 131 through 138. Each of cache entries 131 through 138 includes a respective address register and data register. The number of cache entries and sizes of their registers may differ across embodiments. Moreover, some embodiments may employ any implementation of a cache memory that is or becomes known.

Decision tree 300 comprises decision cell layers 310, 320 and 330. First decision cell layer 310 comprises decision cells 311 through 314, second decision cell layer 320 comprises decision cells 321 and 322, and third decision cell layer 330 comprises root decision cell 331. According to some embodiments, a number of layers K of decision tree 300 is equal to $\log_2 M$, where M is equal to the number of cache entries. For purposes of the present explanation, layer 330 may be referred to as the Kth layer and layer 320 may be referred to as the (K−1)th layer.

In the illustrated embodiment, each decision cell of decision tree 300 is associated with two decision cells of a "downstream" layer (i.e., layer to the right of the cell) and with only one decision cell of an "upstream" layer (i.e., layer to the left of the cell). Each decision cell of decision tree 300 indicates one of the two downstream decision cells with which it is associated. The indication may consist of any system to indicate one of two elements, including but not limited to a signal that indicates only one of its two downstream cells, and a bit or other flag of the decision cell that identifies only one of the two downstream cells. The illustrated embodiment shows each decision cell indicating an associated downstream decision cell that is higher on the page than its other associated downstream cell. In some embodiments, the indications of tree 300 may initially be in another state or combination of states.

Figure 4:
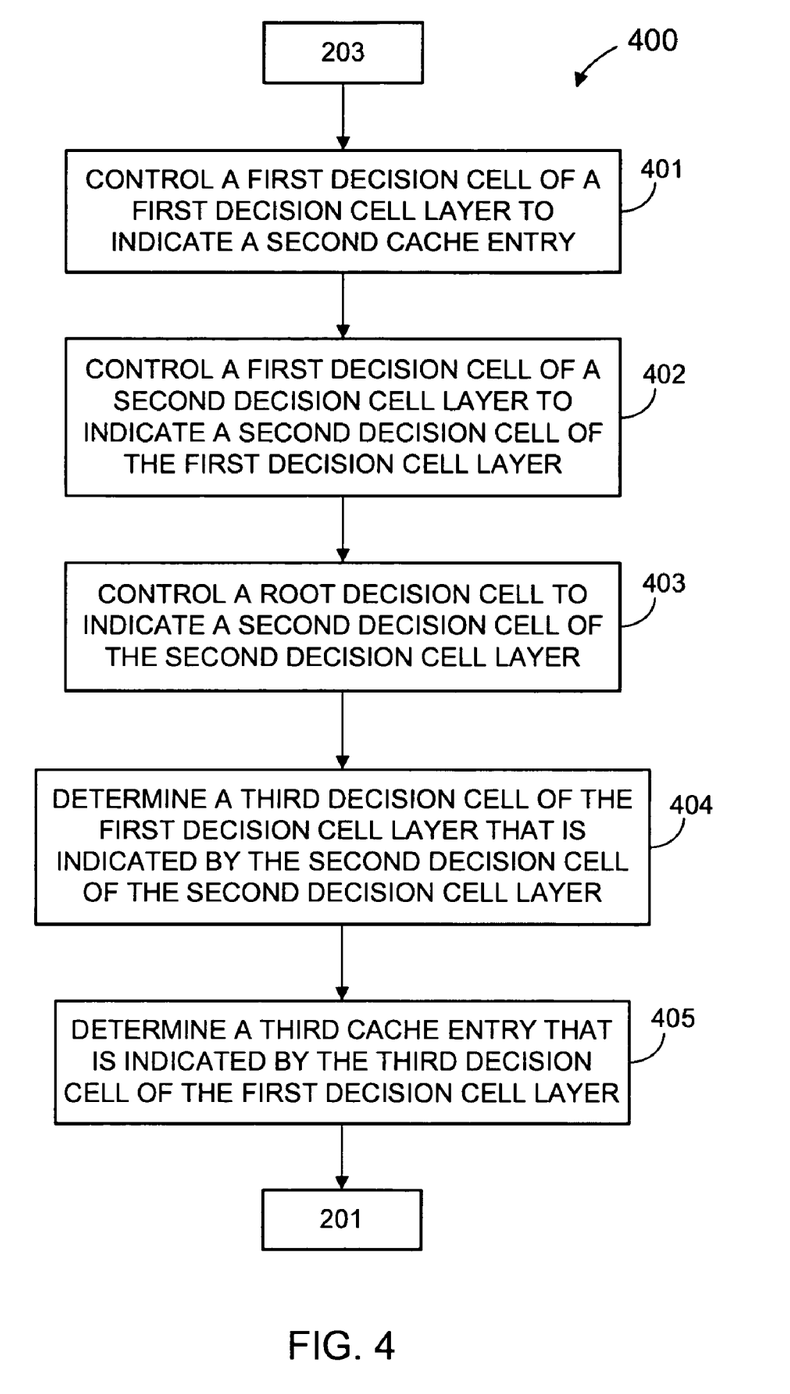
FIG. 4 is a flow diagram of a process to determine a pseudo least recently-used cache entry according to some embodiments.

FIG. 4 is a flow diagram of process 400 to update a PLRU determination at 204 of process 200 according to some embodiments. Process 400 may be executed by cache memory 130 and/or decision tree 300. In this regard, decision tree 300 may be implemented using any suitable combination of hardware, software and firmware.

Initially, at 401, a first decision cell of a first decision cell layer is controlled to indicate a second cache entry. The first decision cell is associated with the matching cache entry and the second cache entry. For the present example, and as shown in FIG. 3, it will be assumed that cache entry 131 is the matching cache entry that was read from or written to at 203 of process 200. Accordingly, decision cell 311 of first decision cell layer 310 is controlled at 401 to indicate cache entry 132.

Figure 5:
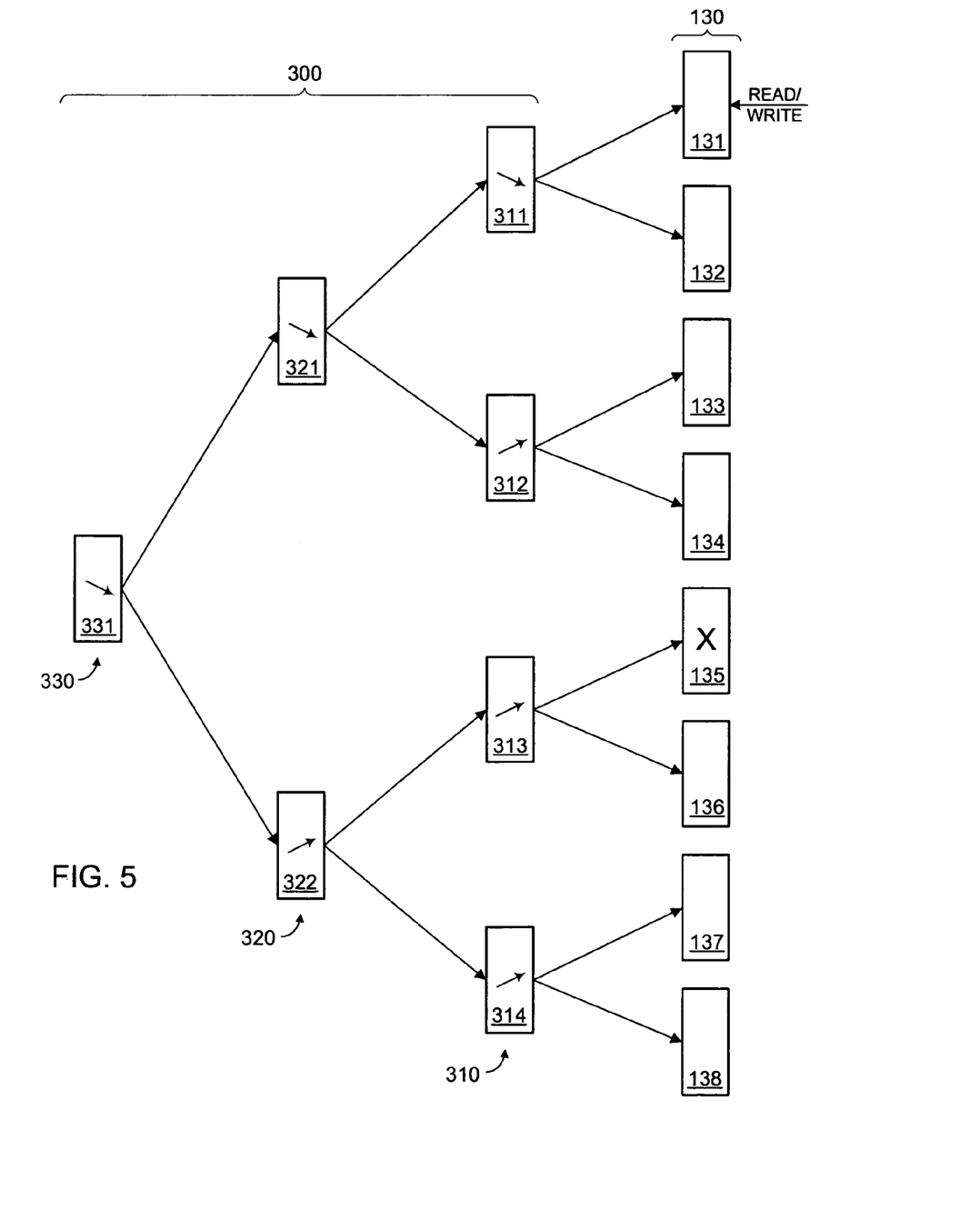
FIG. 5 is a block diagram representing cache entries and decision cell layers according to some embodiments.

FIG. 5 shows decision cell 311 after it is controlled to indicate cache entry 132. The indication may consist of any system to indicate one of two elements, including but not limited to a signal that is sent from decision cell 311 to cache entry 132, and a flag of decision cell 311 (or a data structure that represents decision cell 311) that identifies cache entry 132.

A first decision cell of a second decision cell layer is controlled at 402 to indicate a second decision cell of the first decision cell layer. The first decision cell of the second decision cell layer is associated with the first decision cell of the first decision cell layer (e.g., decision cell 311) and the second decision cell of the first decision cell layer. FIG. 5 also shows decision tree 300 after 402. Specifically, decision cell 321 of second decision cell layer 320, which is associated with decision cell 311 and decision cell 312, has been controlled to indicate decision cell 312.

Next, at 403, a root decision cell is controlled at 402 to indicate a second decision cell of the second decision cell layer. The root decision cell is associated with the first decision cell of the second decision cell layer (e.g., decision cell 321) and the second decision cell of the second decision cell layer. As shown in FIG. 5, root decision cell 331, which is associated with decision cell 321 and decision cell 322, has been controlled to indicate decision cell 322.

A third decision cell of the first decision cell layer is determined at 404. The third decision cell is indicated by the second decision cell of the second decision cell layer. In some embodiments of 404, tree 300 is traversed from root decision cell 331 based on respective indications of each decision cell. Consequently, tree 300 is traversed from decision cell 331 to decision cell 322 because decision cell 331's indication of decision cell 322. Next, decision cell 313 is determined at 404 based on decision cell 322's indication thereof.

At 405, a third cache entry is determined to be the PLRU cache entry. The third cache entry is indicated by the third decision cell of the first decision cell layer. Continuing with the above example, cache entry 135 is determined at 405 due to its indication by decision cell 313. Flow then returns to 201 of process 200 as described above.

Returning to process 200, it will be assumed that a write instruction is then received at 201. It will also be assumed that a memory address associated with the write instruction does not match address information stored in any address register of cache 130. Accordingly, flow proceeds from 202 to 205 and, because the instruction is a write instruction, on to 206.

At 206, the data associated with the write instruction is written to the specified memory address of die memory 140. Then, at 207, the data is written to the data register of the currently-determined PLRU cache entry. As shown in FIG. 5, the data is written to the data register of cache entry 135 according to the current example. The memory address of the write instruction (or information indicative of the memory address) is written to the address register of cache entry 135 at 207 as well.

Figure 6:
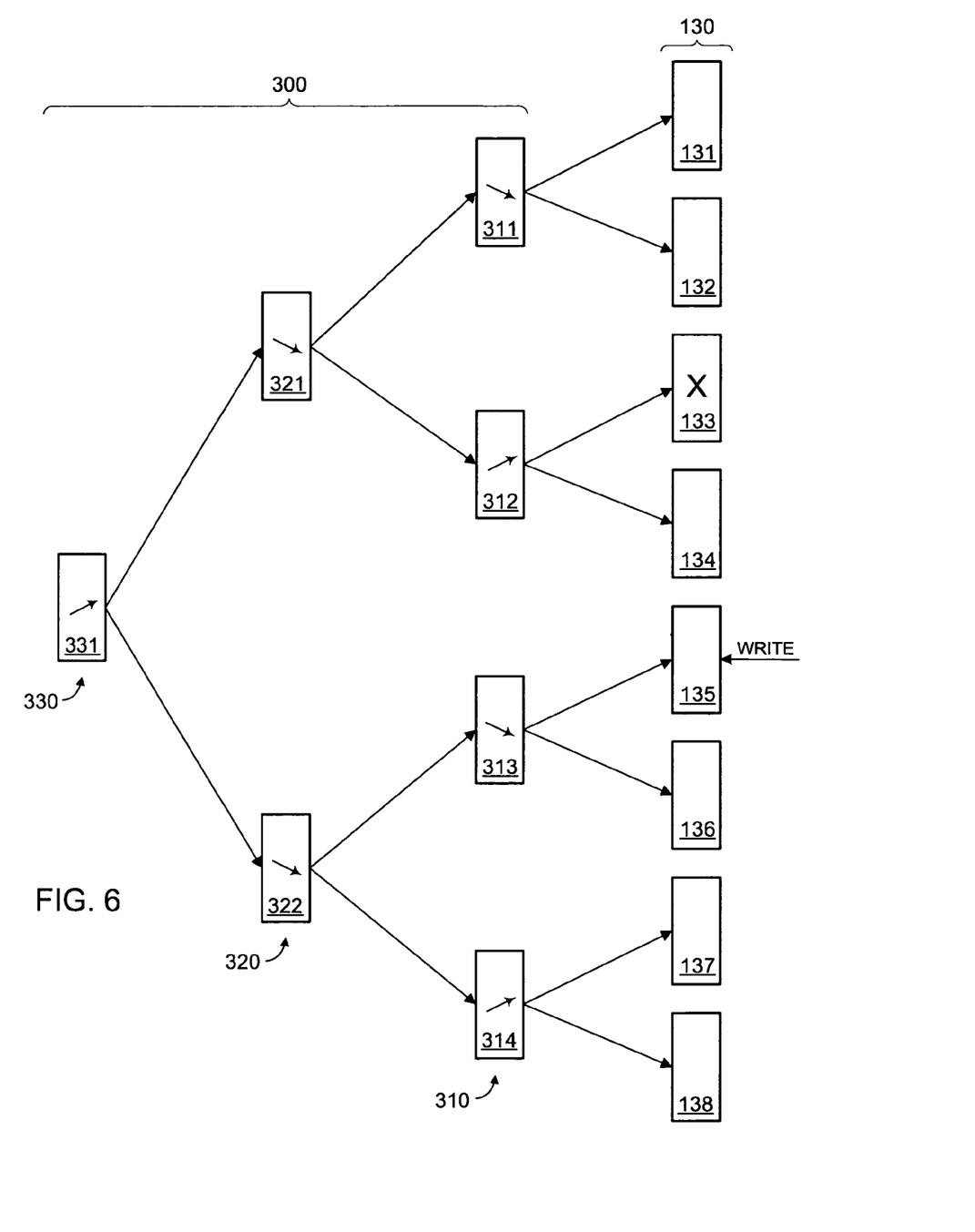
FIG. 6 is a block diagram representing cache entries and decision cell layers according to some embodiments.

The PLRU determination is then updated at 204 as described above. FIG. 6 illustrates the updated PLRU determination according to the present example. According to process 400, decision cells 313 and 322 have been controlled to indicate cache entry 136 and decision cell 314, respectively, and root decision cell 331 has been controlled to indicate decision cell 321. Tree 300 is then traversed from root decision cell 331 according to the indications of cells 331, 321 and 312 to determine cache entry 133 as the PLRU cache entry.

Still continuing with the above example, a read instruction is then received at 201. The read instruction specifies a memory address that does not match address information stored in any address register of cache 130. Flow therefore proceeds from 202 to 205 and, because the instruction is a read instruction, on to 208.

Figure 7:
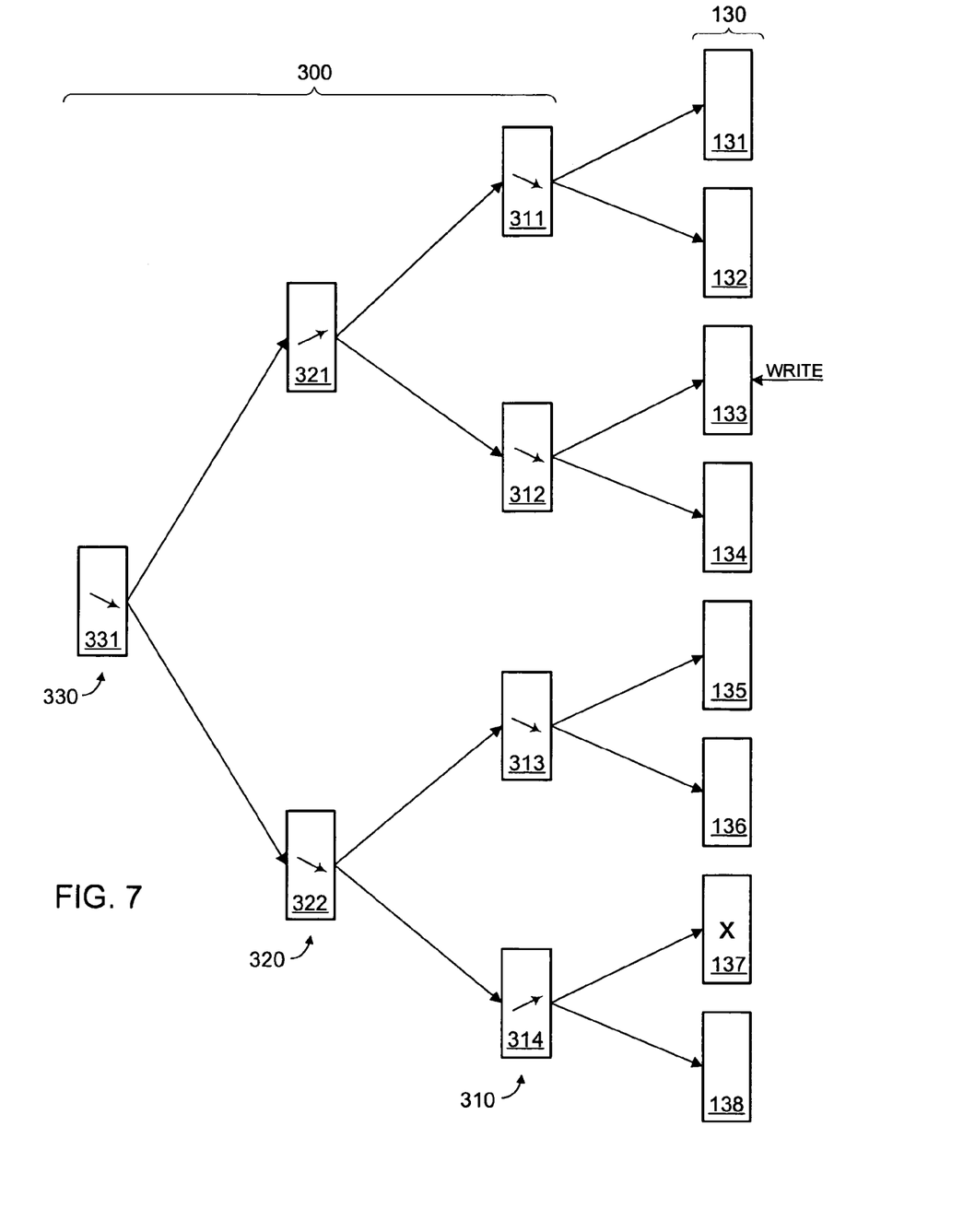
FIG. 7 is a block diagram representing cache entries and decision cell layers according to some embodiments.

Data is read from the specified memory address of die memory 140 at 208. The read data is then written to the data register of the currently-determined PLRU cache entry at 207. FIG. 7 illustrates writing of the data to the data register of cache entry 133 according to the current example. The memory address of the read instruction (or information indicative of the memory address) is written to the address register of cache entry 133 at 207.

Next, the PLRU determination is again updated at 204 as described above. According to some embodiments, no change is made to the PLRU determination in a case that a read address does not match any address stored in a cache entry. In these cases, flow may proceeds from 208 to 201.

Returning to the present example, an updated PLRU determination is illustrated in FIG. 7. Decision cells 312 and 321 have been controlled to indicate cache entry 134 and decision cell 311, respectively, and root decision cell 331 has been controlled to indicate decision cell 322. Tree 300 is traversed from root decision cell 331 according to the indications of cells 331, 322 and 314 to determine cache entry 137 as the PLRU cache entry. Flow may then return to 201 and continue as described above.

Some embodiments are implemented in conjunction with more decision cell layers than shown in decision tree 300. In some of these embodiments, decision cells of these additional decision cell layers may be controlled between 401 and 402 of process 400 based on the above description of 402. Moreover, 404 may include the traversal of several decision cell layers based on the indications of their constituent decision cells. The indication of a decision cell of a first decision cell layer by a decision cell of a second decision cell layer therefore does not preclude the existence of one or more decision cell layers between the first decision cell layer and the second decision cell layer.

Figure 8:
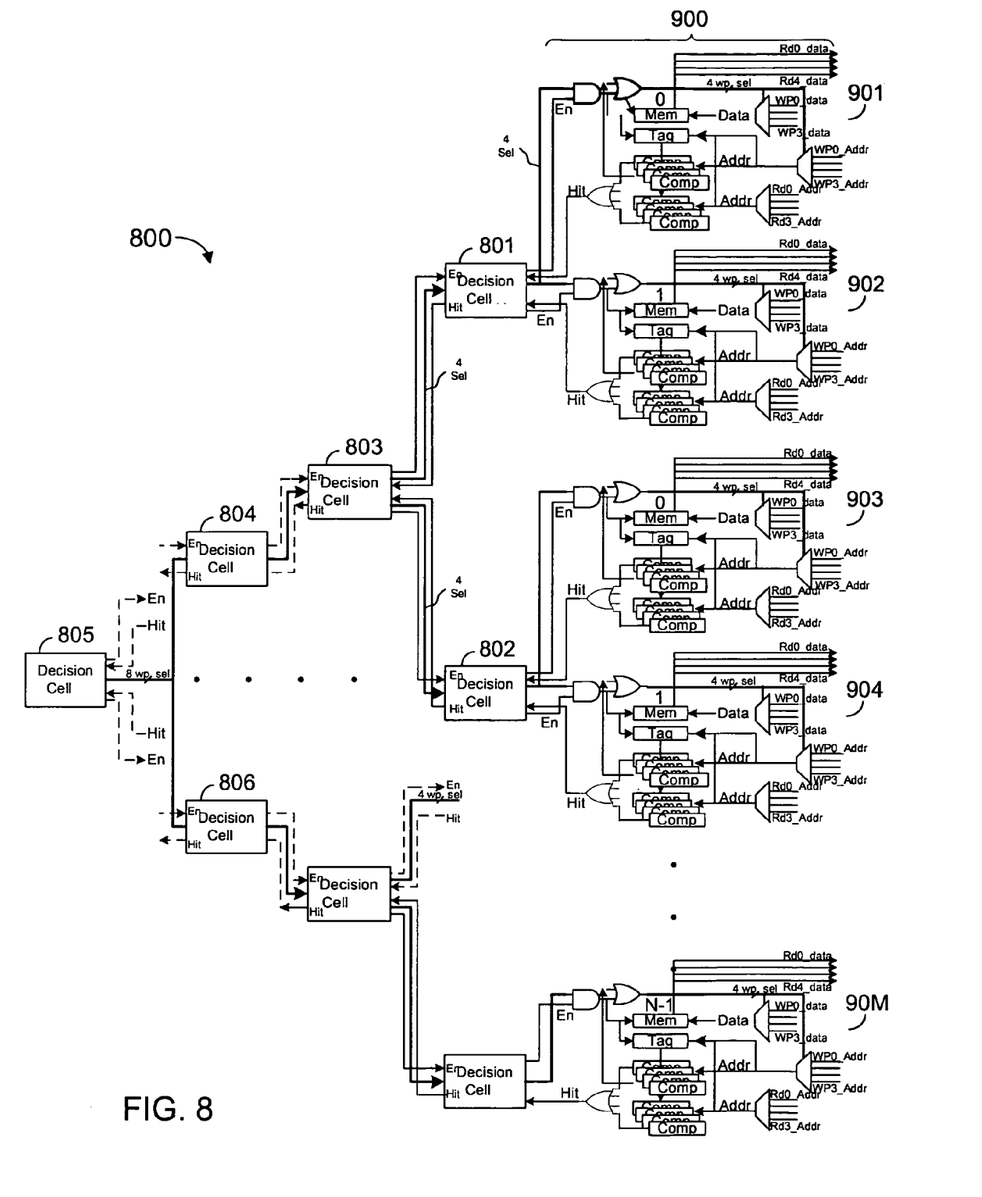
FIG. 8 is a logical diagram of a portion of a multiport cache memory and decision cells according to some embodiments.

FIG. 8 is a logic diagram of some decision cells of decision tree 800 and some associated cache entries of multiport cache memory 900 according to some embodiments. The logic elements shown therein may be implemented by any suitable combination of hardware and/or software.

Cache memory 900 includes M cache entries, with five cache entries 901 through 90M being illustrated. Each cache entry 901 through 90M includes four read ports and four write ports. Cache entries according to some embodiments may include other numbers of read ports and/or write ports. Each cache entry 901 through 90M comprises a data register (Mem) and an address register (Tag). A comparator is associated with each read port and each write port of each cache entry.

The comparators associated with the write ports may, at 202 of process 200, compare a memory address of a received write instruction with address information stored in each address register. If a match is found, the input write data mux select line of the matching cache entry is activated so as to route the write data to the write port associated with the matching address. The write data is thereby written into the data register of the cache entry.

The comparators associated with the read ports may, at 202, compare a memory address of a received read instruction with address information stored in each address register. If a match is found, data stored in the data register of the matching cache entry is provided to the appropriate output read port.

A "hit" signal is generated by the matching cache entry in either of the above two cases. The hit signal indicates a read from or a write to the matching cache entry. The hit signal is received by an associated decision of a first layer of decision cells, which indicates another one of the two cache entries with which it is associated. For example, in response to receiving a hit signal from cache entry 904, decision cell 802 indicates cache entry 903. The indication may comprise asserting one of two enable signals that enable (for writing) cache entry 903. Decision cell 802 may also transmit a hit signal to decision cell 803 in response to receiving a hit signal from cache entry 904.

Figure 9:
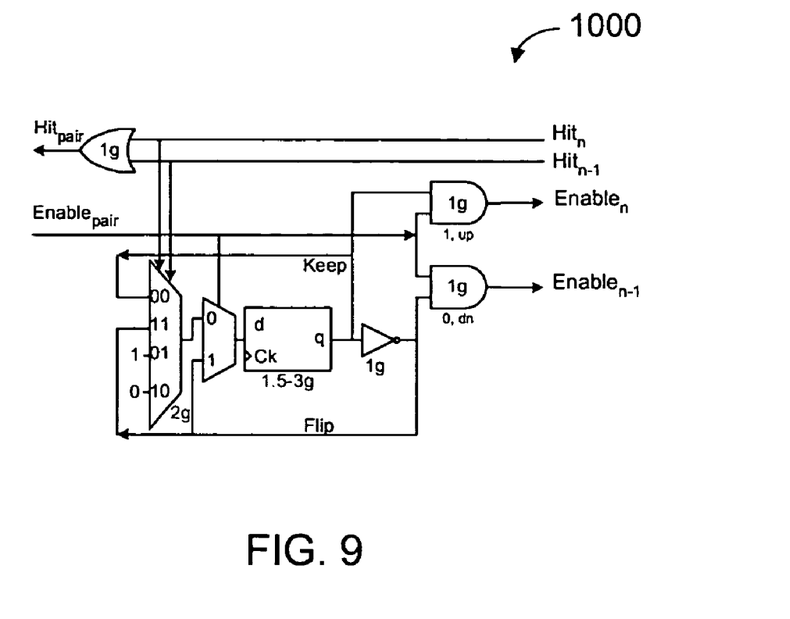
FIG. 9 is a logical diagram of a decision cell for a single port cache memory according to some embodiments.

FIG. 9 is a logic diagram of decision cell 1000, which is used in some embodiments to implement any decision cells of decision tree 800 other than decision cell 805. However, decision cell 1000 is usable in conjunction with single port cache entries, rather than with the multiport cache entries of memory 900. A single port implementation will be described presently, with an explanation of a multiport decision cell implementation to follow.

Assuming that decision cell 1000 is an implementation of decision cell 802, reception of a hit signal from either cache entry 903 or 904 causes transmission of a hit signal to decision cell 803. Reception of a hit signal from cache entry 904 causes assertion of one of the inputs to the upper AND gate, the output of which is used to enable cache entry 903. Conversely, reception of a hit signal from cache entry 903 causes assertion of one of the inputs to the lower AND gate, the output of which is used to enable cache entry 904.

Continuing with the single port example, decision cell 803 may also be implemented by decision cell 1000 and may therefore operate in response to the received hit signal as described above with respect to decision cell 802. In some embodiments, decision cell 803 may indicate (or enable) decision cell 801 and transmit a hit signal to decision cell 804. In response to a hit signal received from decision cell 803, decision cell 804 may indicate a decision cell (not shown) of the second decision cell layer with which it is associated. Decision cell 804 transmits a hit signal to root decision cell 805 upon receipt of a hit signal from either of the two downstream decision cells with which it is associated.

Figure 10:
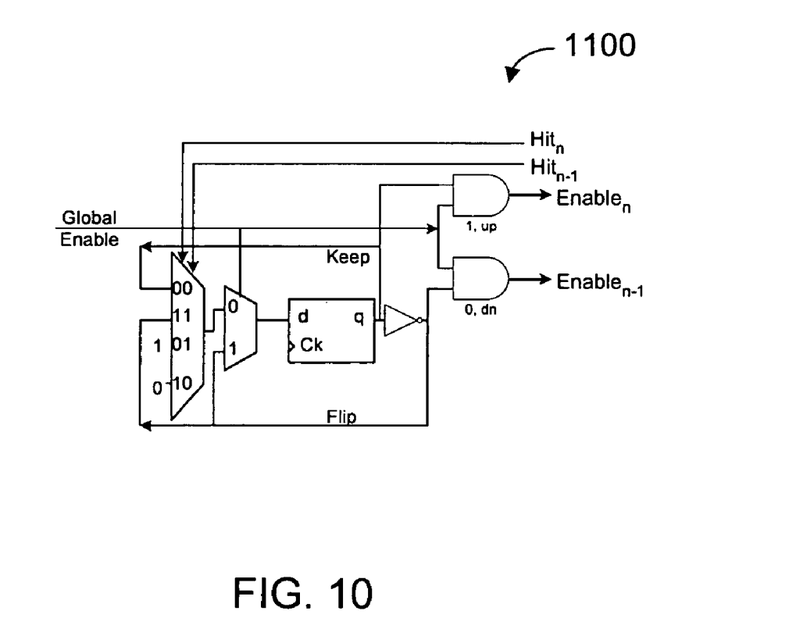
FIG. 10 is a logical diagram of a root decision cell for a single port cache memory according to some embodiments.

Decision cell 805 may be implemented by decision cell 1100 of FIG. 10 in a single port implementation. Decision cell 1100 does not generate a hit signal, but rather accepts a global input enable signal (e.g., a cache memory enable signal).

The architecture of the decision cells of tree 800 may differ from decision cells 1000 and 1100. In a case that each cache entry of memory 900 includes four write ports, up to four entries might be written into memory 900 in a single cycle. Accordingly, some embodiments generate cache entry selector signals.

Figure 11:
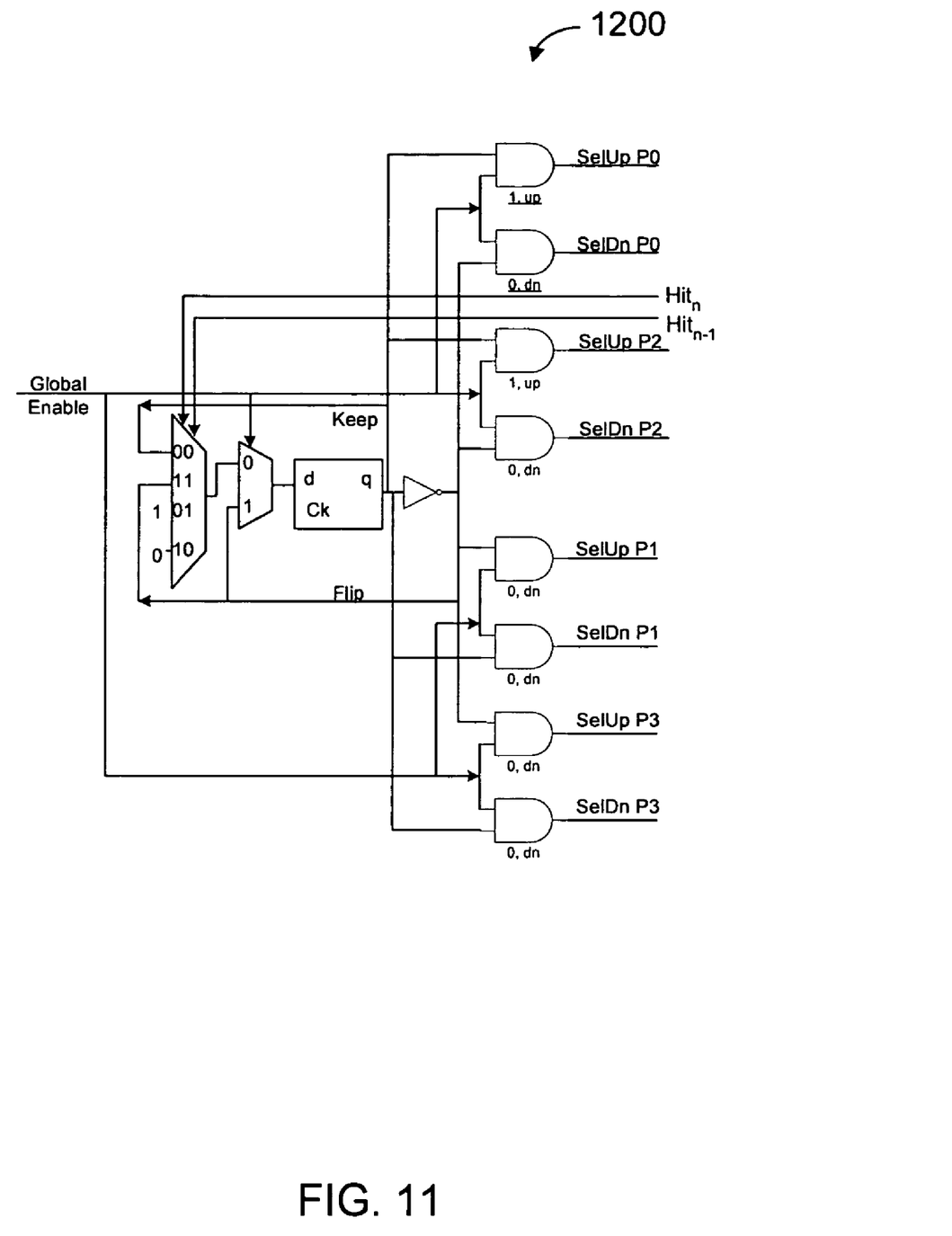
FIG. 11 is a logical diagram of a root decision cell for a multiport cache memory according to some embodiments.

Root decision cell 805 outputs four sets of SelUp and SelDn signals. Each set corresponds to one of four possible write cache entries. Decision cell 1200 of FIG. 11 illustrates an implementation of cell 805 according to some embodiments. As shown, signals P0 and P2 are enabled "up" and signals P1 and P3 are enabled "dn" if the state element stores a 1. Conversely, signals P0 and P2 are enabled "dn" and signals P1 and P3 are enabled "up" if the state element stores a 0. Selector signals P0 and P2 thereby follow the protocol described above for the root decision cell in the single port case, while signals P1 and P3 follow an opposite protocol.

Figure 12:
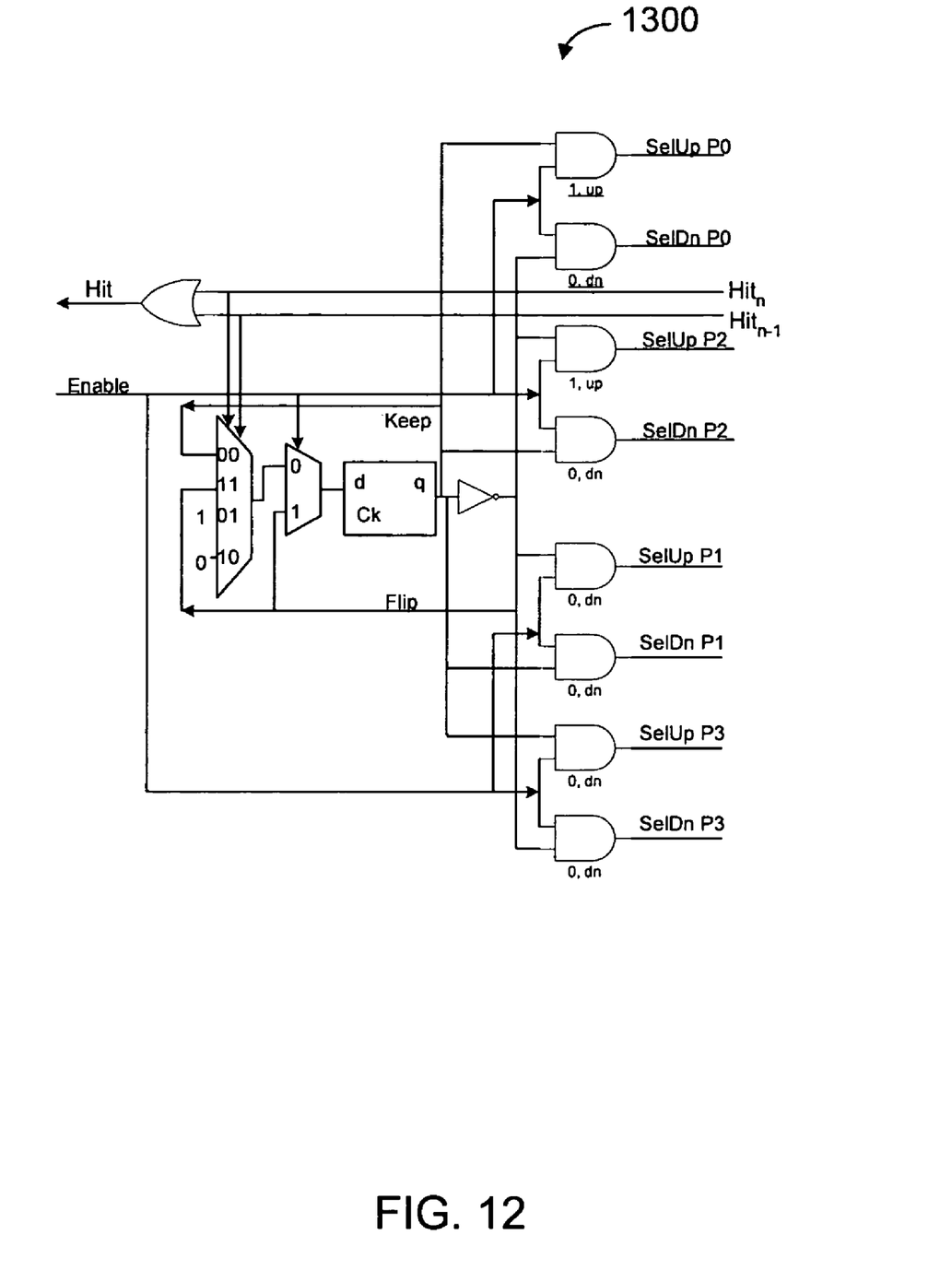
FIG. 12 is a logical diagram of a decision cell for a multiport cache memory according to some embodiments.

FIG. 12 illustrates an implementation of each other decision cell of decision tree 800 in a multiport embodiment. In a case that decision cell 1300 implements cells 804 and 806, selector signals P0 and P1 are enabled "up", while selector signals P2 and P3 are enabled "dn". Thus, only selector signal P0 follows the PLRU selection protocol that would have been followed in a single port implementation, while selector signals P2, P1 and P3 might progressively depart therefrom. The aforementioned four selector signals may be assigned to the physical write ports of memory 900 based on which ports are actually writing in any one clock cycle, and based on any chosen architectural priority.

The several embodiments described herein are solely for the purpose of illustration. Embodiments may include any currently or hereafter-known versions of the elements described herein. Therefore, persons in the art will recognize from this description that other embodiments may be practiced with various modifications and alterations.

What is claimed is:

1. A method to determine one of M cache entries, each of the M cache entries associated with data storage and address storage, the method comprising:
    receiving an indication that data is read from or written to a first one of the M cache entries;
    controlling a first decision cell of a first decision cell layer to indicate a second one of the M cache entries, the first decision cell of the first decision cell layer associated with the first one of the M cache entries and the second one of the M cache entries;
    controlling a first decision cell of a second decision cell layer to indicate a second decision cell of the first decision layer, the first decision cell of the second decision cell layer associated with the first decision cell of the first decision layer and the second decision cell of the first decision layer;
    controlling a root decision cell to indicate a second decision cell of the second decision layer, the root decision cell associated with the first decision cell of the second decision layer and the second decision cell of the second decision layer,
        wherein the root decision cell comprises a four input multiplexer, a two input multiplexer, a D flip flop, a first AND gate, a second AND gate, and a NOT gate,
        wherein the two input multiplexer receives an output of the four input multiplexer, and an output of the NOT gate,
        wherein the D flip flop receives an output of the two input multiplexer,
        wherein the not gate receives an output of the D flip flop,
        wherein the first AND gate receives the output of the NOT gate and receives a signal from an enable line,
        wherein the second AND gate receives the output of the D flip flop and receives the signal from the enable line, and
        wherein the four input multiplexer receives the output of the D flip flop, the output of the NOT gate, a first hit signal, and a second hit signal;
    determining a third decision cell of the first decision layer that is indicated by the second decision cell of the second decision layer; and
    determining a third one of the M cache entries that is indicated by the third decision cell of the first decision layer.

2. A method according to claim 1, further comprising:
    receiving an instruction to write first data to a first memory address;
    determining that none of the M cache entries is associated with the first memory address; and
    writing the first data to the third one of the M cache entries.

3. A method according to claim 2, further comprising:
    writing the first data to the first memory address.

4. A method according to claim 1, further comprising:
    receiving an instruction to write first data to a first memory address;
    determining that a fourth one of the M cache entries is associated with the first memory address; and
    writing the first data to the fourth one of the M cache entries.

5. A method according to claim 4, further comprising:
    writing the first data to the first memory address.

6. A method according to claim 1, further comprising:
    receiving an instruction to write first data to a first memory address;
    determining that the third one of the M cache entries is associated with the first memory address; and
    writing the first data to the third one of the M cache entries.

7. A method according to claim 1,
    wherein controlling the first decision cell of the first decision cell layer to indicate the second one of the M cache entries comprises enabling the second one of the M cache entries for a write operation,
    wherein controlling the first decision cell of the second decision cell layer to indicate the second decision cell of the first decision layer comprises enabling the second decision cell of the first decision layer to enable one of the M cache entries, and
    wherein controlling the root decision cell to indicate the second decision cell of the second decision layer comprises enabling the second decision cell of the second decision layer to enable a decision cell of the first decision layer to enable one of the M cache entries.

8. A method according to claim 1, further comprising:
    controlling the second decision cell of the second decision layer to enable the third one of the M cache entries for a write operation.

9. A method according to claim 1, further comprising:
    controlling the second decision cell of the second decision layer to enable a first port of a plurality of ports of the third one of the M cache entries for a write operation.

10. An apparatus comprising:
    M cache entries, each of the M cache entries to transmit a signal indicating a read from or a write to the cache entry and comprising data storage and address storage; and
    K layers of decision cells, where $K=\log_2 M$, the K layers comprising:
        a first layer of M/2 decision cells, each of the M/2 decision cells of the first layer to receive the signal from one of a respective two of the M cache entries, to indicate the other one of the respective two of the M cache entries and to transmit a hit signal in response to the signal;
        a second layer of M/4 decision cells, each of the M/4 decision cells of the second layer to receive the hit signal from one of a respective two of the M/2 decision cells of the first layer, and to enable the other one of the respective two of the M/2 decision cells of the first layer and transmit a second hit signal in response to the signal;
        a (K−1)th layer of two decision cells, each of the two decision cells of the (K−1)th layer to receive the second hit signal from one of a respective two decision cells of the (K−2)th layer, and to enable the other one of the respective two decision cells of the (K−2)th layer and transmit a third hit signal in response to the second hit signal; and a Kth layer of a root decision cell, the root decision cell to receive the third hit signal from one of a respective two decision cells of the (K−1)th layer, and to enable the other one of the respective two decision cells of the (K−1)th layer in response to the third hit signal, wherein the root decision cell comprises a four input multiplexer, a two input multiplexer, a D flip flop, a first AND gate, a second AND gate, and a NOT gate, wherein the two input multiplexer receives an output of the four input multiplexer, and an output of the NOT gate, wherein the D flip flop receives an output of the two input multiplexer, wherein the NOT gate receives an output of the D flip flop, wherein the first AND gate receives the output of the NOT gate and receives a signal from an enable line, wherein the second AND gate receives the output of the D flip flop and receives the signal from the enable line, and wherein the four input multiplexer receives the output of the D flip flop, the output of the NOT gate, a first hit signal, and a second hit signal.

11. An apparatus according to claim 10, each of the M cache entries further comprising:
a circuit to receive a first memory address, to determine that the first memory address is stored in a memory address register, and to transmit the signal to a decision cell of the first layer that is associated with the cache entry.

12. An apparatus according to claim 10, each of the M cache entries further comprising:
a circuit to receive a first memory address, to determine that the first memory address is not stored in a memory address register, to determine that the cache entry is enabled for writing, to write the first memory address to the memory address register, and to write information associated with the first memory address to the data register.

13. An apparatus according to claim 12, each of the M cache entries further to transmit the signal in response to writing the information associated with the first memory address to the data register.

14. An apparatus according to claim 10, each of the M cache entries further comprising:
a first plurality of ports to write to; and
a second plurality of ports to read from.

15. A system comprising:
a microprocessor comprising a cache memory, the cache memory comprising:
M cache entries, each of the M cache entries to transmit a signal indicating a read from or a write to the cache entry and comprising data storage and address storage; and
K layers of decision cells, where $K=\log_2 M$, the K layers comprising:
a first layer of M/2 decision cells, each of the M/2 decision cells of the first layer to receive the signal from one of a respective two of the M cache entries, to indicate the other one of the respective two of the M cache entries and to transmit a hit signal in response to the signal;

a second layer of M/4 decision cells, each of the M/4 decision cells of the second layer to receive the hit signal from one of a respective two of the M/2 decision cells of the first layer, and to enable the other one of the respective two of the M/2 decision cells of the first layer and transmit a second hit signal in response to the signal;

a (K−1)th layer of two decision cells, each of the two decision cells of the (K−1)th layer to receive the second hit signal from one of a respective two decision cells of the (K−2)th layer, and to enable the other one of the respective two decision cells of the (K−2)th layer and transmit a third hit signal in response to the second hit signal; and a Kth layer of a root decision cell, the root decision cell to receive the third hit signal from one of a respective two decision cells of the (K−1)th layer, and to enable the other one of the respective two decision cells of the (K−1)th layer in response to the third hit signal, wherein the root decision cell comprises a four input multiplexer, a two input multiplexer, a D flip flop, a first AND gate, a second AND gate, and a NOT gate, wherein the two input multiplexer receives an output of the four input multiplexer, and an output of the NOT gate, wherein the D flip flop receives an output of the two input multiplexer, wherein the not gate receives an output of the D flip flop, wherein the first AND gate receives the output of the NOT gate and receives a signal from an enable line, wherein the second AND gate receives the output of the D flip flop and receives the signal from the enable line, and wherein the four input multiplexer receives the output of the D flip flop, the output of the NOT gate, a first hit signal, and a second hit signal; and a double-data rate random access memory in communication with the microprocessor.

16. A system according to claim 15, each of the M cache entries further comprising:
a circuit to receive a first memory address, to determine that the first memory address is stored in a memory address register, and to transmit the signal to a decision cell of the first layer that is associated with the cache entry.

17. A system according to claim 15, each of the M cache entries further comprising:
a circuit to receive a first memory address, to determine that the first memory address is not stored in a memory address register, to determine that the cache entry is enabled for writing, to write the first memory address to the memory address register, and to write information associated with the first memory address to the data register.

* * * * *